W. DRUMMOND.
Corn-Planter.
No. 22,171. Patented Nov 30, 1858.
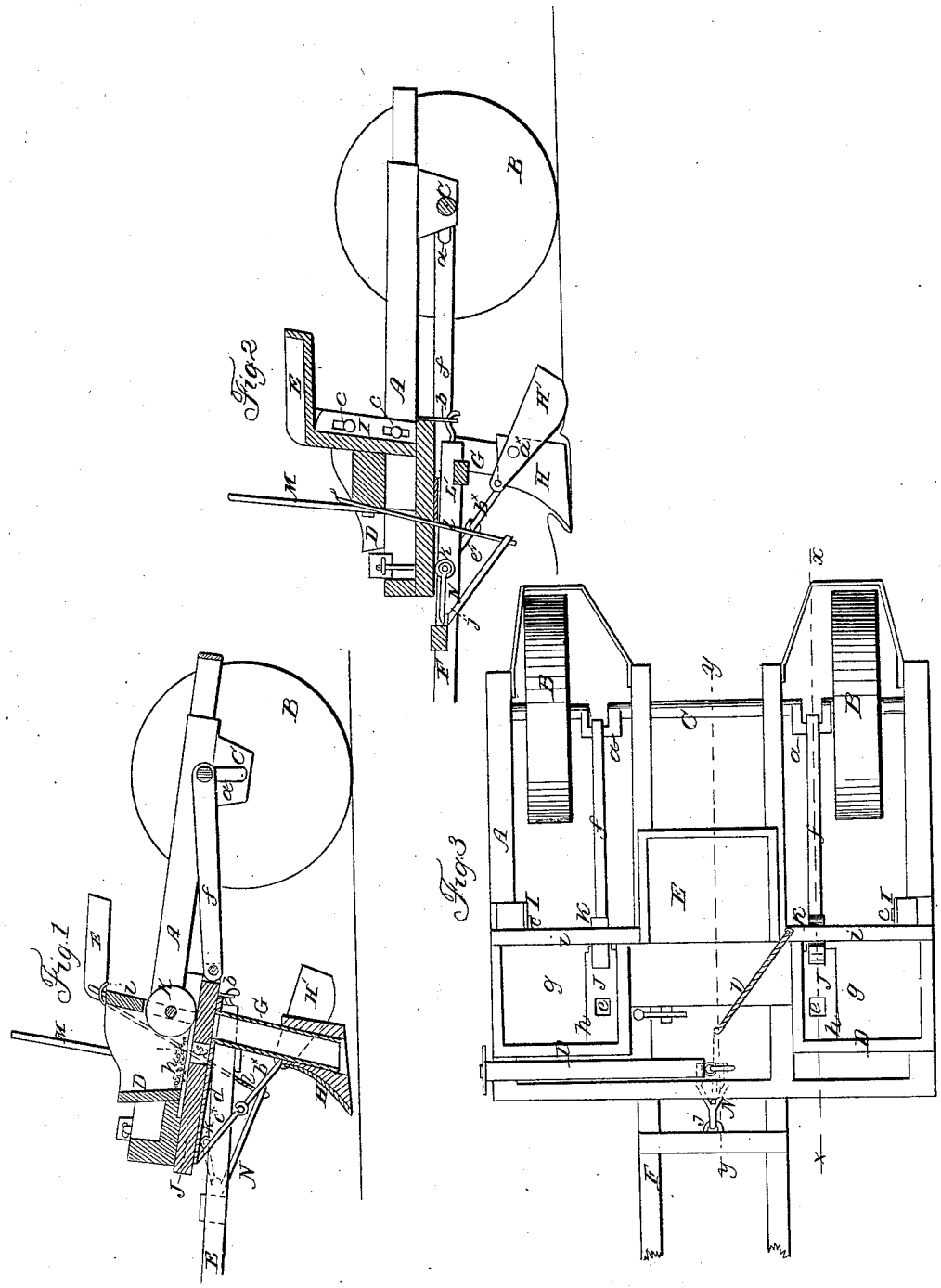

UNITED STATES PATENT OFFICE.

WARREN DRUMMOND, OF WOODBRIDGE, NEW JERSEY.

IMPROVEMENT IN SEEDING-MACHINES.

Specification forming part of Letters Patent No. 22,171, dated November 30, 1858.

*To all whom it may concern:*

Be it known that I, WARREN DRUMMOND, of Woodbridge, in the county of Middlesex and State of New Jersey, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\, x$, Fig. 3. Fig. 2 is also a side sectional view of the same, taken in the line $y\, y$, Fig. 3. Fig. 3 is a plan or top view of the same.

Similar letters of reference indicate corresponding parts in the several figures.

This invention relates to an improved seed-distributing device.

The invention is designed for planting seed in hills or drills, more especially for planting in hills in check-rows; and the improvement is intended to prevent the clogging or choking of the seed-distributing device, and also the breaking of the seed as the seed-cells are drawn underneath the cut-off—a contingency which frequently occurs with the ordinary seed cut-off.

To enable those skilled in the art to fully understand and construct my invention, I will proceed to describe it.

A represents a rectangular frame, the back part of which is supported by wheels B B, the axle C of the wheels being provided with two cranks, $a\, a$, both of which are shown in Fig. 3. On the front part of the frame A two seed-boxes, D D, are placed, one at each side, and a driver's seat, E, elevated at a proper height, is placed between the two seed-boxes.

F represents thills or shafts, the back ends of which are attached to the under side of the frame A, some distance from its front end, as shown clearly at $b$ in Figs. 1 and 3.

G G represent two seed-tubes, each of which has a share, H, at its lower end, the tubes passing into the shares, as shown clearly in Fig. 1. The shares H may be of the usual or any proper form, and each has a plate, I, attached to its upper end, said plates being slotted and secured to the frame A by screws $c$, which pass through said slots. By means of this attachment the shares may be raised and lowered, so that they will penetrate the earth at a greater or less depth, as may be desired, the shares being allowed to slide freely on the seed-tubes G G.

Underneath each seed-box D a slide, J, is placed. These slides are fitted in guide-boxes $d$, attached to the under sides of the seed-boxes. Each slide J has a hole, $e$, made in it, and the back ends of the slides are connected by rods $f$ with the cranks $a\, a$. The bottoms $g$ of the seed-boxes D directly over the slides J are slotted or perforated, as shown at $h$, Fig. 3, and in the backs $i$ of each seed-box a wheel, K, constructed of india-rubber or other elastic material, is placed. These wheels K rest on the slides J, and about one-half of them project within the said boxes. (See Fig. 1.)

The upper ends of the seed-tubes G G communicate with the guide-boxes $d$, near their back ends, as shown clearly in Fig. 1, and to the under side of the frame A a metal plate, L, is placed, said plate being allowed to slide transversely with the framing A, and having a lever, M, attached to it, said lever extending up in front of the driver's seat E. The ends of the plate L extend underneath the bottoms of the seed-boxes D D, and the ends of the plate are slotted and, by adjusting lever M, serve as cut-offs and cover the slots or openings $h$ in the bottoms of the seed-boxes, and thereby prevent the distribution of seed when necessary.

To the thills or shafts E a bent lever, N, is attached, as shown at $j$. The end of the upper part of this lever has a friction-roller, $k$, fitted in it, and the end of the lower part has a cord, $l$, attached, said cord passing up through the frame A in front of the driver's seat E.

To the shares H covering-shares H′ are attached by pivots $a^x$. The front ends of these shares are attached by a link, $b^x$, to straining-rods $c'$, which retain the shares in proper position.

The operation is as follows: As the machine is drawn along the cranks $a\, a$ of the axle C, in connection with the rods $f$, give a reciprocating movement to the slides J J, and the seed is discharged from the seed-boxes in measured quantities by the holes $e$, the elastic rollers K serving as cut-offs between the seed in the boxes and the holes $e$ when the latter are over the tubes G. The rollers K operate quite differently from all the cut-offs that I have seen. They do not scrape off the seed from the holes, and thereby break the grains or kernels that may project above the orifice of the holes *e;* but they press down and yield or give, so that the projecting seed may pass underneath them. The distributing device therefore will not be liable to choke or clog. The attendant at any time may raise the shares H by drawing upward the cord *l*, so that the roller K will bear against the front part of the frame A and raise the frame and shares, so that the latter may pass over obstructions, and as the machine is being moved from place to place the shares H may be elevated above the ground by relaxing the screws *c*, the shares being retained at the desired height by again screwing up the screws *c*. The covering-shares H perform their function, as usual.

Having thus described my invention, what I claim as new, and desire to secure by Letters Patent, is—

The elastic rollers K, arranged relatively with the slides J, to operate as and for the purpose set forth.

WARREN DRUMMOND.

Witnesses:
 WM. TUSCH,
 W. HAUFF.